(12) United States Patent
Joshi

(10) Patent No.: US 12,242,595 B2
(45) Date of Patent: Mar. 4, 2025

(54) DATA MANAGEMENT USING SECURE BROWSERS

(71) Applicant: Stripe, Inc., South San Francisco, CA (US)

(72) Inventor: Akshay Joshi, Ottawa (CA)

(73) Assignee: Stripe, Inc., South San Francisco, CA (US)

( * ) Notice: Subject to any disclaimer, the term of this patent is extended or adjusted under 35 U.S.C. 154(b) by 205 days.

(21) Appl. No.: 17/979,648

(22) Filed: Nov. 2, 2022

(65) Prior Publication Data

US 2024/0143735 A1 May 2, 2024

(51) Int. Cl.
*G06F 21/53* (2013.01)
*G06F 21/57* (2013.01)
*G06F 16/958* (2019.01)
*G06F 21/62* (2013.01)

(52) U.S. Cl.
CPC ............ *G06F 21/53* (2013.01); *G06F 21/577* (2013.01); *G06F 16/958* (2019.01); *G06F 16/972* (2019.01); *G06F 21/62* (2013.01); *G06F 2221/033* (2013.01)

(58) Field of Classification Search
CPC ........ G06F 21/53; G06F 21/577; G06F 21/62; G06F 16/958; G06F 16/972
See application file for complete search history.

(56) References Cited

U.S. PATENT DOCUMENTS

| | | | | |
|---|---|---|---|---|
| 11,803,635 B2* | 10/2023 | Wing | ...................... | G06F 21/45 |
| 2020/0089898 A1* | 3/2020 | Borkar | ..................... | G06F 21/44 |
| 2022/0342981 A1* | 10/2022 | Wing | .................... | G06F 21/606 |
| 2022/0360607 A1* | 11/2022 | Amiga | .................... | H04L 63/20 |

OTHER PUBLICATIONS

"Browser Security Explained: Threats and Defensive Measures"—Perception Point, Industry Insights, Aug. 11, 2022 https://perception-point.io/blog/browser-security-threats-solutions-user-education/ (Year: 2022).*
"Secure Browser to Stay Private and Safe in 2022"—Theme Circle, Mar. 2022 https://www.themecircle.net/secure-browser-stay-private-safe-2022/ (Year: 2022).*

* cited by examiner

*Primary Examiner* — Randy A Scott
(74) *Attorney, Agent, or Firm* — BAKERHOSTETLER

(57) ABSTRACT

Various embodiments described herein support or provide for data management operations, such as receiving a request to access a webpage; determining that accessing the webpage requires secure access via a secure browser; identifying a virtual machine that is configured to allow access to the webpage; and causing display of the webpage in the secure browser embedded in a local browser of the sender device.

20 Claims, 8 Drawing Sheets

DATA MANAGEMENT USING SECURE BROWSERS

TECHNICAL FIELD

The present disclosure generally relates to data management, and, more particularly, various embodiments described herein provide for systems, methods, techniques, instruction sequences, and devices that facilitate secure data retrieval, transmission, and storage.

BACKGROUND

Data systems face challenges when accessing data from certain resources to obtain and/or exchange sensitive data protected by various rules and regulations. It is even more challenging to access sensitive data from such resources that not only do not provide automated means (e.g., an Application Programming Interface) but also impose restrictions on employing automation measures for data exchange and retrieval.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of examples, and not limitations, in the accompanying figures.

DETAILED DESCRIPTION

Figure 1:
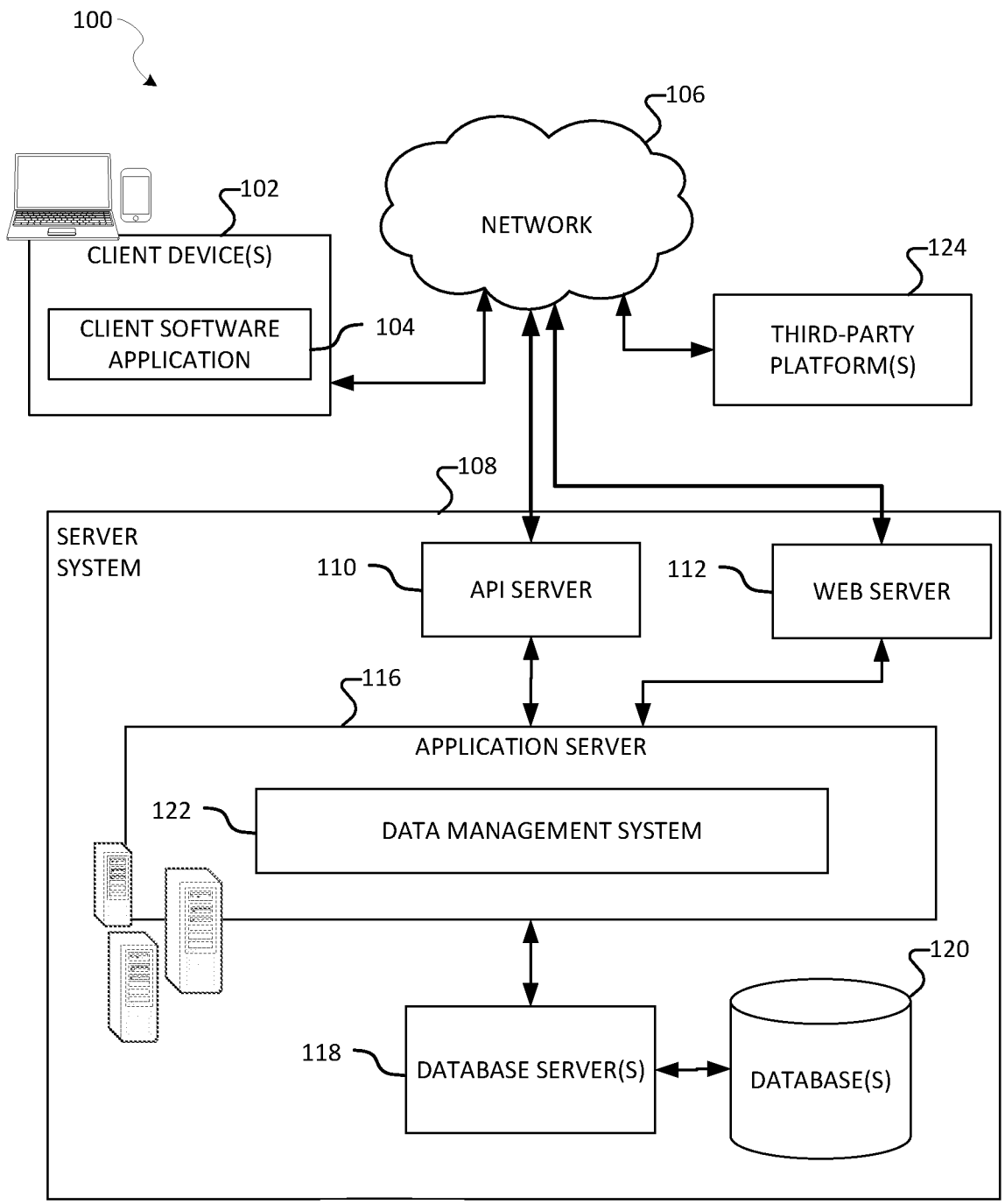
FIG. 1 is a block diagram showing an example data system that includes a data management system, according to various embodiments of the present disclosure.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter may be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various embodiments may be given throughout this description. These are merely descriptions of specific embodiments. The scope or meaning of the claims is not limited to the embodiments given.

Certain resources (e.g., web domains) do not provide automated means, such as an Application Programming Interface (API), for data exchange and retrieval. In some instances, such domains may even impose restrictions on employing automation measures, especially if the data may include sensitive information (e.g., names, social security numbers, credit card information) that is protected by various rules and regulations, such as data privacy regulations.

Various embodiments include systems, methods, and non-transitory computer-readable media for managing data, particularly facilitating secure data accessing, transmission, and storage using secure browsers. A secure browser may be directly managed by a remote virtual machine and may be embedded (or nested) in a browser run by a local device (e.g., the sender device). Specifically, a secure browser (e.g., a secure browser window) can be generated and displayed within a browser window that is run by a local device. A user of the local device can perform various operations as described herein via the secure browser. Any data transmitted and/or exchanged between the secure browser and the resource (e.g., a webpage) cannot be accessed from a desktop of the local device. This approach prevents data exchanged between the secure browser and the resource from being accessed by (or exposed to) malware, malicious actor, and/or users of the local device (e.g., the sender device).

In various embodiments, upon receiving one or more requests to access a webpage, a data management system determines that such access requires a secure browser. The data management system identifies a virtual machine that is configured to allow secure access to the webpage and determines that the secure access is associated with a security policy. A security policy can provide a preconfigured directory that is directly managed by the data management system and can also disable one or more commands (e.g., copy, save, paste, cut) on the virtual machine. Furthermore, an isolation boundary may exist between the local device (e.g., the sender device) and the virtual machine such that data exchanged between the secure browser and the resource cannot be accessed by (or exposed to) users of the local device (e.g., the sender device). In various embodiments, a secure application may be managed by a data management system and run in the background to gain access to the data from the preconfigured directory for various downstream operations. A preconfigured directory (e.g., preconfigured download/upload directory) may reside in a virtual memory that is directly managed by one or more virtual machines. The secure application can also be configured to detect if any of such data is inadvertently exposed to the user of the local device.

In various embodiments, the data management system may cause the display of the webpage in the secure browser embedded in a local browser of the local device. The secure browser can be generated by the virtual machine or alternatively, be generated by the data management system based on the configurations of the virtual machine. In various embodiments, the virtual machine may be hosted by the data management system, or by an on-demand cloud computing platform that is communicatively coupled to the data management system. The preconfigured directory may be a virtual data storage associated with the virtual machine in the cloud computing platform.

In various embodiments, upon determining that the secure access is associated with one or more security policies, the data management system causes the virtual machine to provide the secure browser embedded in the local browser of the sender device based on the one or more security policies. In various embodiments, the one or more security policies disable one or more commands (e.g., copy, save, paste, cut) on the virtual machine to prevent data exchanged via the secure browser from being accessed by the local device (e.g., the sender device).

In various embodiments, a security policy can only allow secure access to one or more webpages and disable access to any other webpages. Specifically, a security policy can be configured to allow access to a list of webpages during a given browsing session. Attempts to access webpages other than the listed ones will be denied. A message may optionally be generated to alert an administrative user of such attempts. In various embodiments, an access denial message may be generated and caused to be displayed on the local device.

In various embodiments, a security policy can provide one or more preconfigured directories to store files (e.g., a first file) to be uploaded to the webpage and to receive files (e.g., a second file) returned (or retrieved) from the webpage. The one or more preconfigured directories are directly managed by a remote virtual machine. Thereby, the local device cannot access files stored in the one or more preconfigured directories.

In various embodiments, the uploading and downloading of files between the one or more preconfigured directories and the webpage can be performed automatically or manually by a user (e.g., an authorized individual) of the local device.

In various embodiments, the data management system detects that one or more files are returned (or retrieved) from the webpage. The data management system stores the one or more files (or causes the one or more files to be stored) on a virtual memory associated with the virtual machine instead of a memory of the local device.

In various embodiments, a secure browser allows a user of the local device (e.g., sender device) access to a virtual desktop of the virtual machine.

In various embodiments, the data management system provides the sender device with a Uniform Resource Locator (URL) based on the request to access the webpage. A user of the sender device can click on the URL (or enter the URL into a local browser run by the sender device) to initiate a browsing session via the secure browser.

In various embodiments, the data management system detects the activation of the URL by the sender device and causes the display of the webpage in the secure browser embedded in the local browser of the sender device based on the determined security policy.

In various embodiments, one or more security policies can be customized to be strengthened or weakened based on requests, the types of webpages, and/or various restrictions or requirements imposed by the webpages.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes a data management system (hereafter, the data management system 122, or system 122), according to various embodiments of the present disclosure. By including the data management system 122, the data system 100 can facilitate secure data retrieval, transmission, and storage. As shown, the data system 100 includes one or more client devices 102, a server system 108, and a network 106 (e.g., including Internet, wide-area-network (WAN), local-area-network (LAN), wireless network, etc.) that communicatively couples them together. Each client device 102 can host a number of applications, including a client software application 104. The client software application 104 can communicate data with the server system 108 via a network 106. Accordingly, the client software application 104 can communicate and exchange data with the server system 108 via network 106.

The server system 108 provides server-side functionality via the network 106 to the client software application 104. While certain functions of the data system 100 are described herein as being performed by the data management system 122 on the server system 108, it will be appreciated that the location of certain functionality within the server system 108 is a design choice. For example, it may be technically preferable to initially deploy certain technology and functionality within the server system 108, but to later migrate this technology and functionality to the client software application 104.

The server system 108 supports various services and operations that are provided to the client software application 104 by the data management system 122. Such operations include transmitting data from the data management system 122 to the client software application 104, receiving data from the client software application 104 to the system 122, and the system 122 processing data generated by the client software application 104. Data exchanges within the data system 100 may be invoked and controlled through operations of software component environments available via one or more endpoints, or functions available via one or more user interfaces of the client software application 104, which may include web-based user interfaces provided by the server system 108 for presentation at the client device 102.

With respect to the server system 108, each of an Application Program Interface (API) server 110 and a web server 112 is coupled to an application server 116, which hosts the data management system 122. The application server 116 is communicatively coupled to a database server 118, which facilitates access to a database 120 that stores data associated with the application server 116, including data that may be generated or used by the data management system 122.

The API server 110 receives and transmits data (e.g., API calls, commands, requests, responses, and authentication data) between the client device 102 and the application server 116. Specifically, the API server 110 provides a set of interfaces (e.g., routines and protocols) that can be called or queried by the client software application 104 in order to invoke the functionality of the application server 116. The API server 110 exposes various functions supported by the application server 116 including, without limitation: user registration; login functionality; data object operations (e.g., generating, storing, retrieving, encrypting, decrypting, transferring, access rights, licensing, etc.); and user communications.

Through one or more web-based interfaces (e.g., web-based user interfaces), the web server 112 can support various functionality of the data management system 122 of the application server 116 as described herein.

The application server 116 hosts a number of applications and subsystems, including the data management system 122, which supports various functions and services with respect to various embodiments described herein.

The application server 116 is communicatively coupled to a database server 118, which facilitates access to database(s) 120 in which data associated with the data management system 122 may be stored.

The third-party platforms 124 may host one or more resources, such as web resources (e.g., webpages), as described herein. In various embodiments, the third-party platforms may include an on-demand cloud computing platform that is communicatively coupled to the data management system, as described herein.

Figure 2:
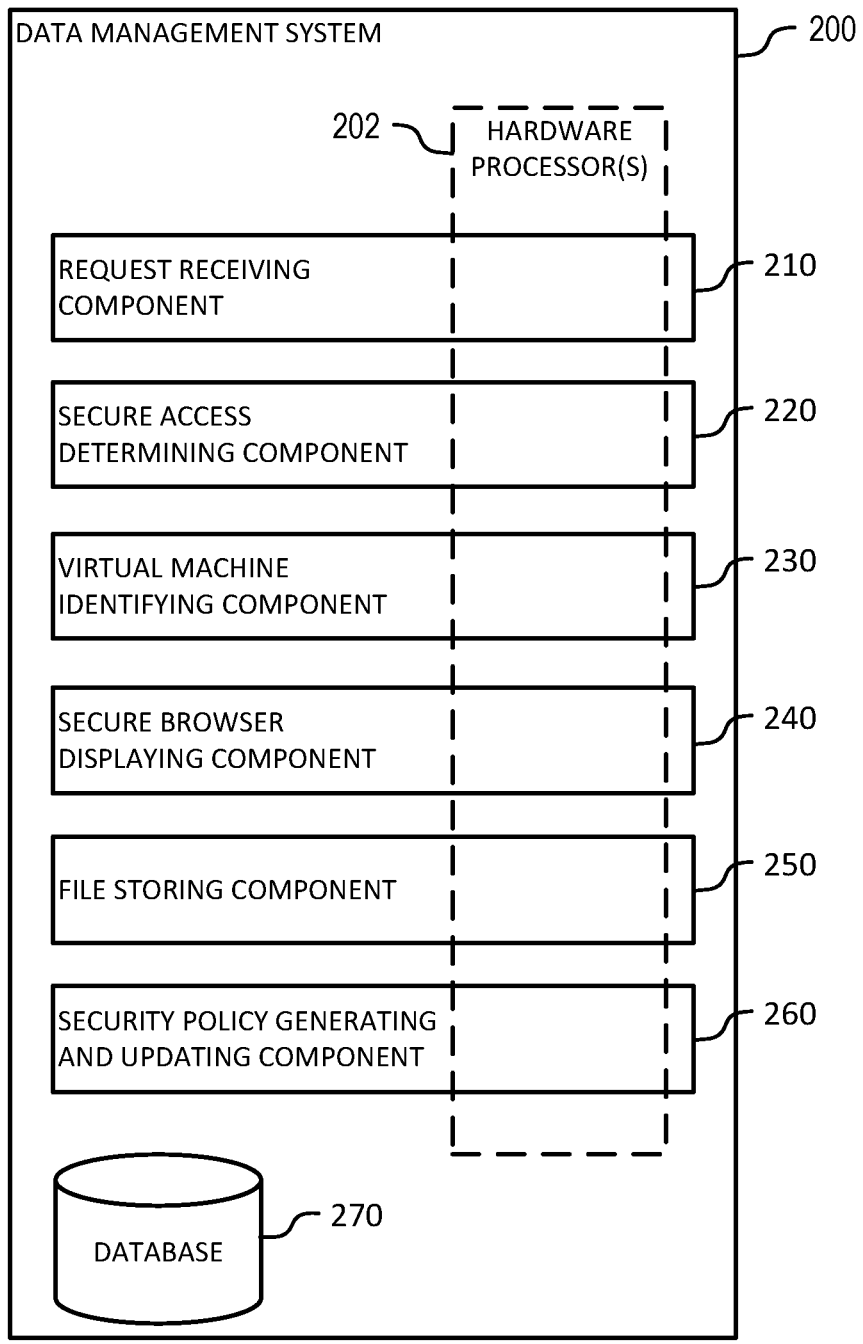
FIG. 2 is a block diagram illustrating an example data management system, according to various embodiments of the present disclosure.

FIG. 2 is a block diagram illustrating an example data management system 200, according to various embodiments of the present disclosure. For some embodiments, the data management system 200 represents an example of the data management system 122 described with respect to FIG. 1. As shown, the data management system 200 comprises a request receiving component 210, a secure access determining component 220, a virtual machine identifying component 230, a secure browser displaying component 240, a file storing component 250, a security policy generating and updating component 260, and a database 270. According to various embodiments, one or more of the request receiving component 210, the secure access determining component 220, the virtual machine identifying component 230, the secure browser displaying component 240, the file storing component 250, the security policy generating and updating component 260 are implemented by one or more hardware processors 202. Data generated by one or more of the request receiving component 210, the secure access determining component 220, the virtual machine identifying component 230, the secure browser displaying component 240, the file storing component 250, the security policy generating and updating component 260 may be stored in a database 270 of the data management system 200.

The request receiving component 210 is configured to receive one or more requests to access one or more resources (e.g., webpages).

The secure access determining component 220 is configured to determine that such access requires one or more secure browsers upon receiving the one or more requests to access the one or more webpages.

The virtual machine identifying component 230 is configured to identify one or more virtual machines that are configured to allow secure access to the one or more webpages and determine that the secure access is associated with one or more security policies. A security policy can provide a preconfigured directory that is directly managed by the data management system (e.g., via the one or more virtual machines) and can also disable one or more commands (e.g., copy, save, paste, cut) on local device via the virtual machine and/or on the virtual machine. Under this approach, data exchanged between a secure browser and a resource cannot be accessed by (or exposed to) users of a local device (e.g., the sender device) that runs a local browser in which the secure browser is hosted.

The secure browser displaying component 240 is configured to cause the display of the one or more webpages in the one or more secure browsers embedded in a local browser of the local device. The one or more secure browsers can be generated by the virtual machine or alternatively, be generated by the data management system based on the configurations of the virtual machine.

The file storing component 250 is configured to store files to be uploaded to the one or more webpages and files returned (or retrieved) from the one or more webpages. The file storing component 250 is configured to store files in one or more preconfigured directories that are directly managed by a remote virtual machine. Under this approach, the local device is prevented from accessing files stored in the one or more preconfigured directories.

The security policy generating and updating component 260 is configured to generate one or more security policies that apply to one or more resources (e.g., webpages). The one or more security policies can be customized to be strengthened or weakened based on requests, the types of webpages, and/or various restrictions or requirements imposed by the one or more webpages.

Figure 3:
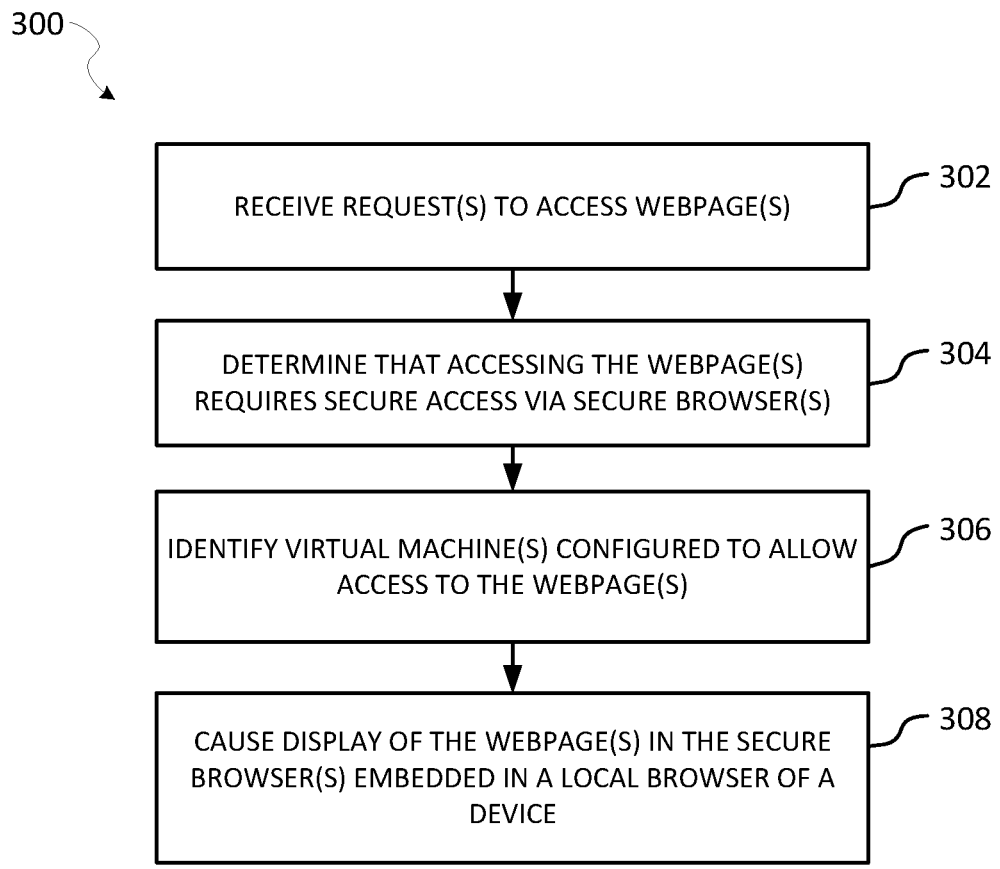
FIG. 3 is a flowchart illustrating an example method for facilitating secure data transmission and storage, according to various embodiments of the present disclosure.

FIG. 3 is a flowchart illustrating an example method 300 facilitating secure data transmission and storage, according to various embodiments of the present disclosure. It will be understood that example methods described herein may be performed by a machine in accordance with some embodiments. For example, method 400 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, a processor receives one or more requests to access one or more resources (e.g., webpages).

At operation 304, a processor determines that such access requires one or more secure browsers upon receiving the one or more requests to access the one or more webpages.

At operation 306, a processor identifies one or more virtual machines that are configured to allow secure access to the one or more webpages and determines that the secure access is associated with one or more security policies.

At operation 308, a processor causes the display of the one or more webpages in the one or more secure browsers embedded in a local browser of the local device. The one or more secure browsers can be generated by the virtual machine or alternatively, be generated by the data management system based on the configurations of the virtual machine.

Though not illustrated, method 300 can include an operation where a graphical user interface can be displayed (or caused to be displayed) by the hardware processor. For instance, the operation can cause a client device (e.g., the client device 102 communicatively coupled to the data management system 122) to display the graphical user interface. This operation for displaying the graphical user interface can be separate from operations 302 through 308 or, alternatively, form part of one or more of operations 302 through 308.

Figure 4:
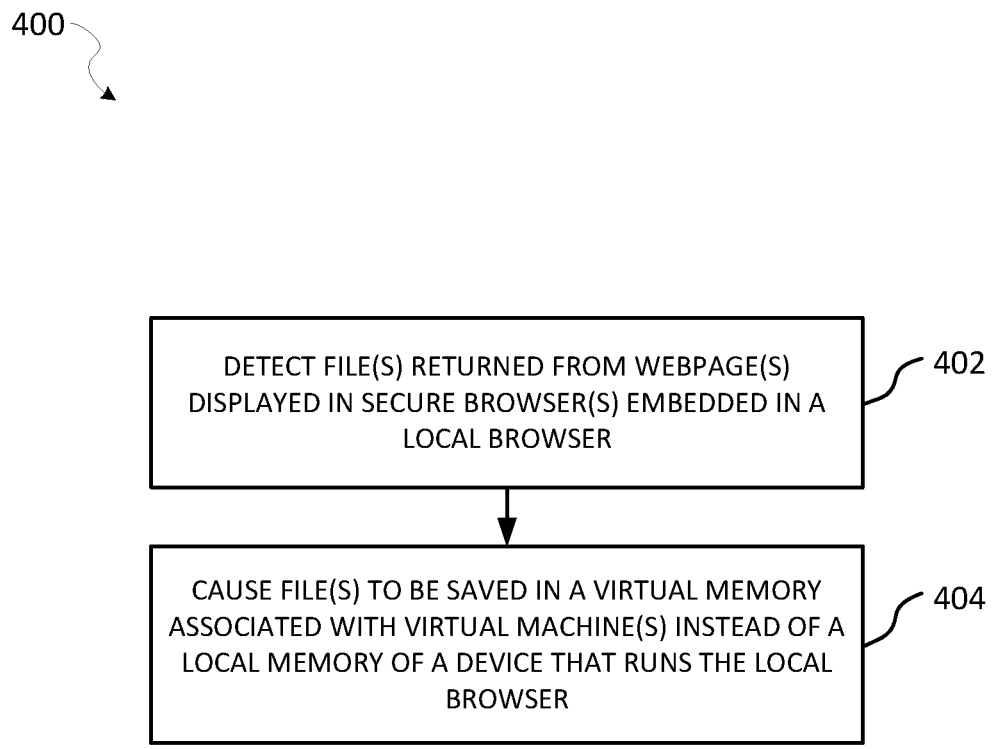
FIG. 4 is a flowchart illustrating an example method for facilitating secure data transmission and storage, according to various embodiments of the present disclosure.

FIG. 4 is a flowchart illustrating an example method 400 facilitating secure data transmission and storage, according to various embodiments of the present disclosure. It will be understood that example methods described herein may be performed by a machine in accordance with some embodiments. For example, method 400 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

In various embodiments, one or more operations of method 400 may be a sub-routine of one or more of the operations of method 300. In various embodiments, one or more operations in method 400 may be performed subsequent to the operations of method 300.

At operation 402, a processor detects that one or more files are returned (or retrieved) from the one or more webpages. The one or more files may include sensitive data that is protected under various rules and regulations.

At operation 404, a processor saves (or causes the one or more files to be saved or stored) in a virtual memory associated with the virtual machine instead of a memory of the local device.

Though not illustrated, method 400 can include an operation where a graphical user interface can be displayed (or caused to be displayed) by the hardware processor. For instance, the operation can cause a client device (e.g., the client device 102 communicatively coupled to the data management system 122) to display the graphical user interface. This operation for displaying the graphical user interface can be separate from operations 402 through 404 or, alternatively, form part of one or more of operations 402 through 404.

Figure 5:
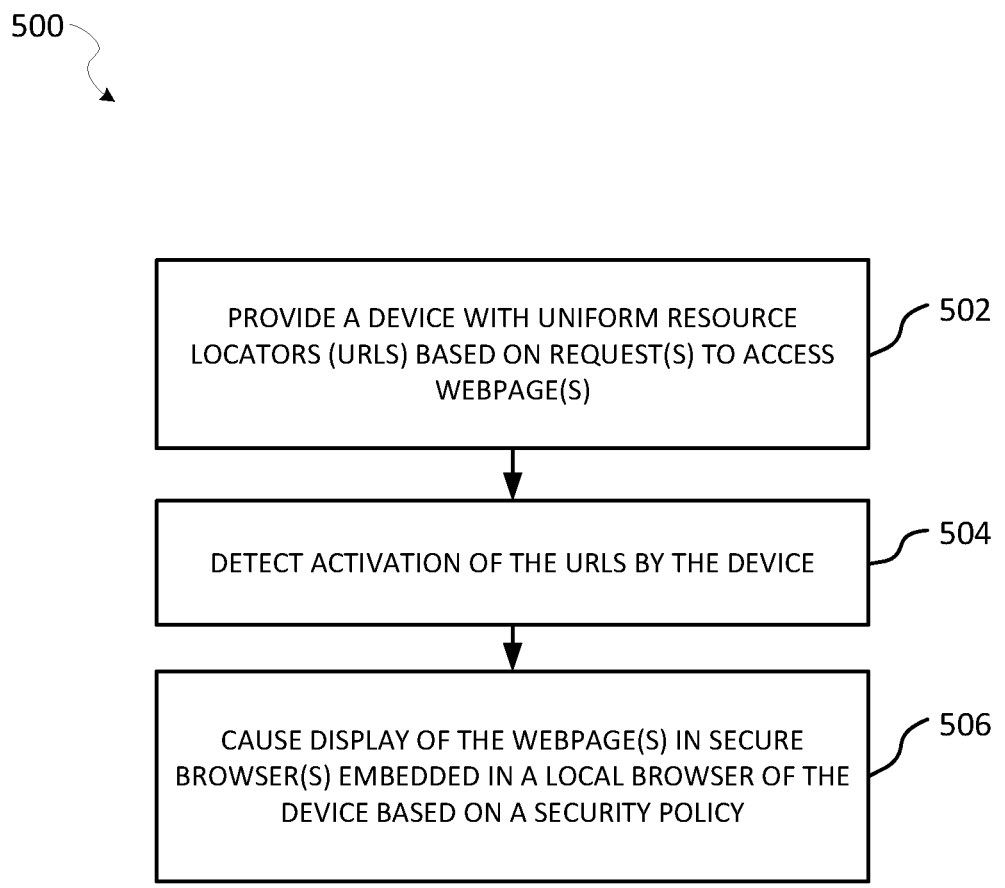
FIG. 5 is a flowchart illustrating an example method for facilitating secure data transmission and storage, according to various embodiments of the present disclosure.

FIG. 5 is a flowchart illustrating an example method 500 facilitating secure data transmission and storage, according to various embodiments of the present disclosure. It will be understood that example methods described herein may be performed by a machine in accordance with some embodiments. For example, method 500 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 500 may be represented by executable instructions that, when executed by a processor of a computing device, cause the computing device to perform method 500. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

In various embodiments, one or more operations of method 500 may be a sub-routine of one or more of the operations of method 300. In various embodiments, one or more operations in method 500 may be performed subsequent to the operations of method 300.

At operation 502, a processor provides a device with one or more Uniform Resource Locators (URLs) based on one or more requests to access the one or more webpages. A user of the device can activate the URLs by clicking (or entering the URLs into a local browser run by the device) to initiate a browsing session via the secure browser.

At operation 504, a processor detects the activation of the URLs by the device.

At operation 506, a processor causes the display of the one or more webpages in the secure browser embedded in the local browser of the device based on the one or more security policies, as described herein.

Though not illustrated, method 500 can include an operation where a graphical user interface can be displayed (or caused to be displayed) by the hardware processor. For instance, the operation can cause a client device (e.g., the client device 102 communicatively coupled to the data management system 122) to display the graphical user interface. This operation for displaying the graphical user interface can be separate from operations 502 through 506 or, alternatively, form part of one or more of operations 502 through 506.

Figure 6:
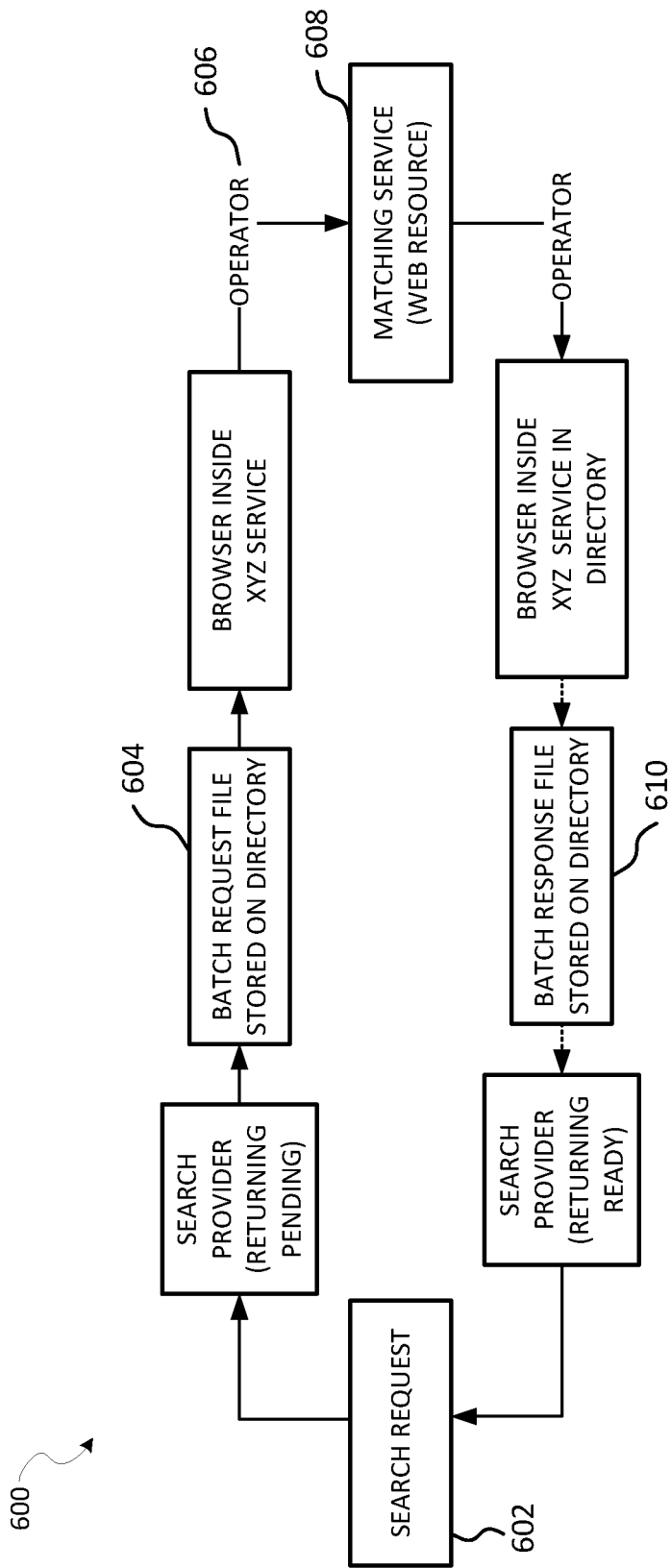
FIG. 6 is a block diagram illustrating data flow in an example data system during operation, according to various embodiments of the present disclosure.

FIG. 6 is a block diagram illustrating data flow 600 in an example data system during operation, according to various embodiments of the present disclosure. As shown, a request (e.g., search request 602) may be submitted via an application provided by the data management system (e.g., the data management system 122 described with respect to FIG. 1, the data management system 200 described with respect to FIG. 2, or individual components thereof). The data management system identifies, at block 604, files that need to be uploaded from a preconfigured directory that is directly managed by one or more virtual machines (not shown). An operator 606 (e.g., a human operator) can upload the files to a third-party service (e.g., matching service 608) via a secure browser operated by an XYZ service (e.g., a service that provides a secure browser managed by virtual machines, a service that provides a secure browser inside of virtual machines) provided by the data management system. The matching service 608 returns files (e.g., files that include personal identifiable information) that can be stored, at block 610, in the preconfigured directory directly managed by one or more virtual machines (or a preconfigured directory inside of one or more virtual machines). The data management system returns a response to request 602 based on the received files that include one or more matching results from the matching service 608. The matching service 608 may be provided by a resource (e.g., a webpage provided by a third-party entity), as described herein.

In various embodiments, matching service 608 can be a web-based tool offered by certain governmental agencies, such as the Internal Revenue Service (IRS) Taxpayer Identification Number (TIN) Matching service. Files that include personal identifiable information (PII), such as Taxpayer Identification Number (TIN) furnished by payees, can be uploaded to the IRS website to match against the name/TIN combination contained in the IRS database. A matching result can be returned in a file that can be downloaded (or retrieved) from the IRS website. All the files exchanged between a secure browser and the IRS website can be stored in the preconfigured directory that is directly managed by one or more virtual machines from the on-demand cloud computing platform (e.g., Amazon AWS), as described herein. The secure browser resides entirely in the on-demand cloud computing platform that is communicatively coupled to the data management system. This approach prevents data (e.g., sensitive data) exchanged between the secure browser and the resource from being accessed by (or exposed to) malware, malicious actor, and/or users of the local device (e.g., the sender device).

Figure 7:
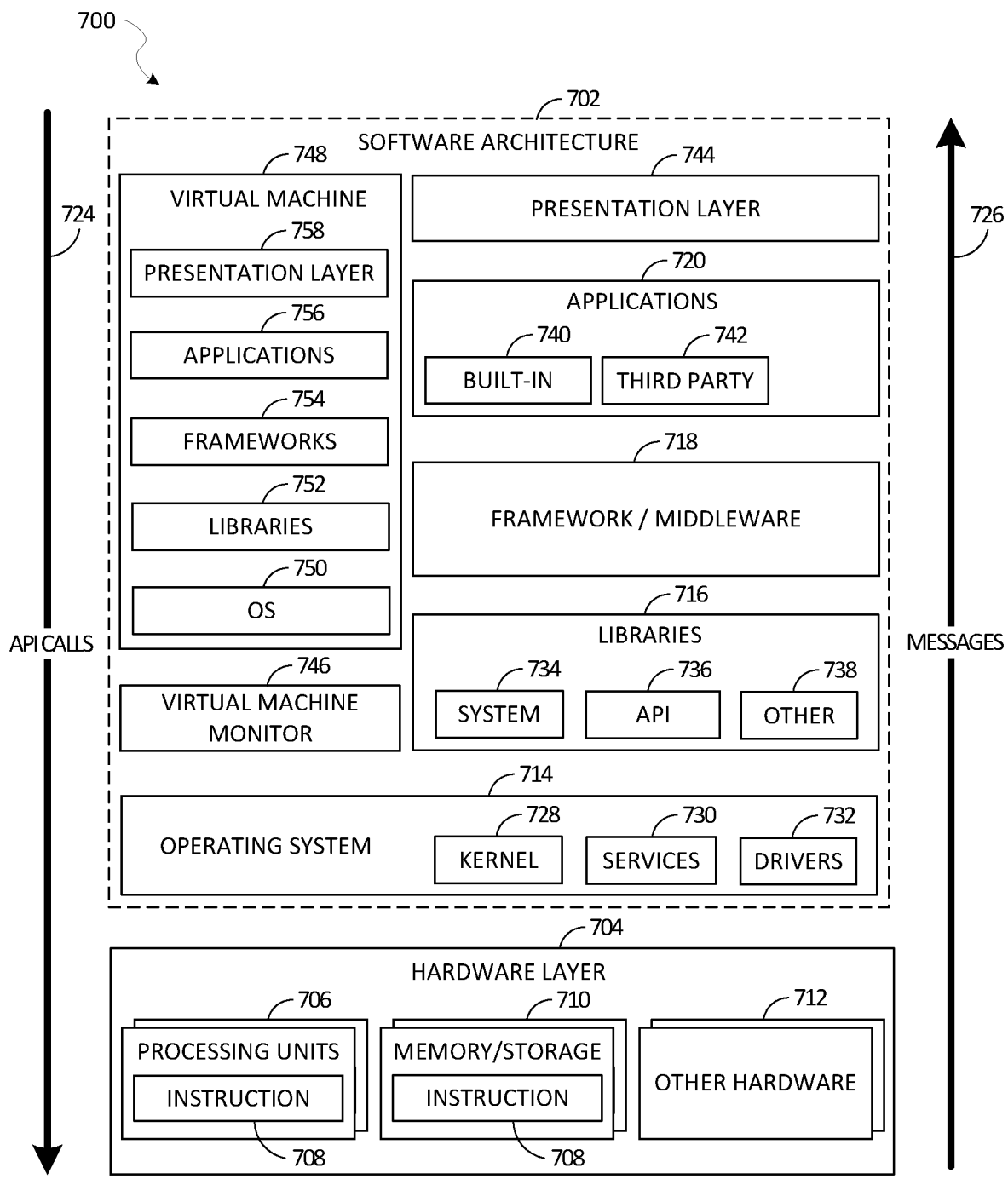
FIG. 7 is a block diagram illustrating a representative software architecture, which may be used in conjunction with various hardware architectures herein described, according to various embodiments of the present disclosure.

FIG. 7 is a block diagram 700 illustrating an example of a software architecture 702 that may be installed on a machine, according to some example embodiments. FIG. 7 is merely a non-limiting example of a software architecture, and it will be appreciated that many other architectures may be implemented to facilitate the functionality described herein. The software architecture 702 may be executing on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 comprises one or more processing units 706 having associated executable instructions 708. The executable instructions 708 represent the executable instructions of the software architecture 702. The hardware layer 704 also includes memory or storage modules 710, which also have the executable instructions 708. The hardware layer 704 may also comprise other hardware 712, which represents any other hardware of the hardware layer 704, such as the other hardware illustrated as part of the machine 1200.

In the example architecture of FIG. 7, the software architecture 702 may be conceptualized as a stack of layers, where each layer provides particular functionality. For example, the software architecture 702 may include layers such as an operating system 714, libraries 716, frameworks/middleware 718, applications 720, and a presentation layer 744. Operationally, the applications 720 or other components within the layers may invoke API calls 724 through the software stack and receive a response, returned values, and so forth (illustrated as messages 726) in response to the API calls 724. The layers illustrated are representative in nature, and not all software architectures have all layers. For example, some mobile or special-purpose operating systems may not provide a frameworks/middleware 718 layer, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), WiFi® drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than by interfacing directly with the underlying operating system 714 functionality (e.g., kernel 728, services 730, or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 or other software components/modules. For example, the frameworks 718 may provide various graphical user interface functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a home application, a contacts application, a browser application, a book reader application, a location application, a media application, a messaging application, or a game application.

The third-party applications 742 may include any of the built-in applications 740, as well as a broad assortment of other applications. In a specific example, the third-party applications 742 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 742 may invoke the API calls 724 provided by the mobile operating system such as the operating system 714 to facilitate functionality described herein.

The applications 720 may utilize built-in operating system functions (e.g., kernel 728, services 730, or drivers 732), libraries (e.g., system libraries 734, API libraries 736, and other libraries 738), or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with the user.

Some software architectures utilize virtual machines. In the example of FIG. 7, this is illustrated by a virtual machine 748. The virtual machine 748 creates a software environment where applications/modules can execute as if they were executing on a hardware machine (e.g., the machine 800 of FIG. 8). The virtual machine 748 is hosted by a host operating system (e.g., the operating system 714) and typically, although not always, has a virtual machine monitor 746, which manages the operation of the virtual machine 748 as well as the interface with the host operating system (e.g., the operating system 714). A software architecture executes within the virtual machine 748, such as an operating system 750, libraries 752, frameworks/middleware 754, applications 756, or a presentation layer 758. These layers of software architecture executing within the virtual machine 748 can be the same as corresponding layers previously described or may be different.

Figure 8:
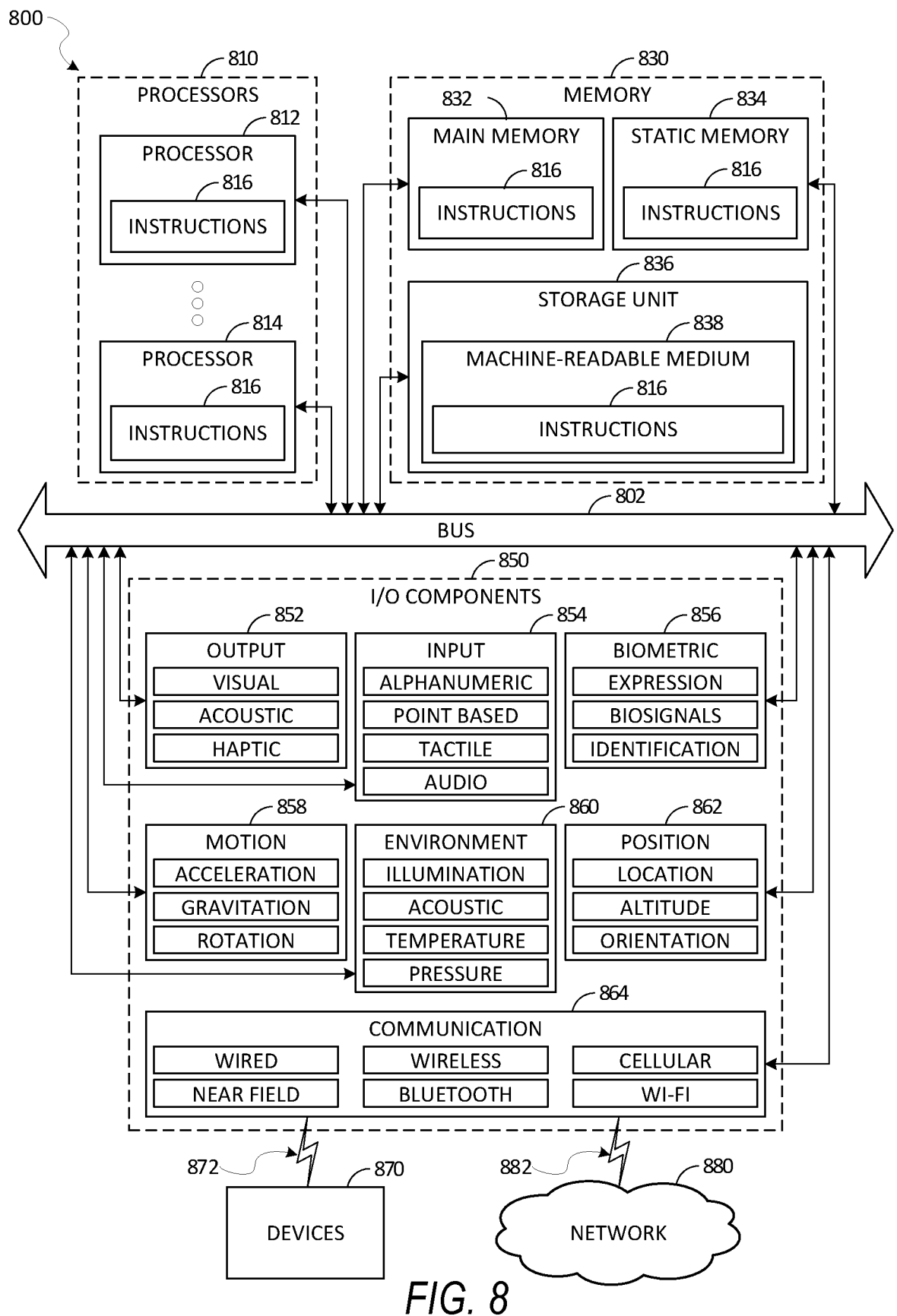
FIG. 8 is a block diagram illustrating components of a machine able to read instructions from a machine storage medium and perform any one or more of the methodologies discussed herein according to various embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute method 300 as described in FIG. 3, method 400 as described in FIG. 4, and method 500 as described in FIG. 5. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an embodiment, the processors 810 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory 830 may include a main memory 832, a static memory 834, and a storage unit 836 including machine-readable medium 838, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 850 may include biometric components 856, motion components 858, environmental components 860, or position components 862, among a wide array of other components. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), WiFi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In various embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 800 including processors 810), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 800, but deployed across a number of machines 800. In some example embodiments, the processors 810 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 830, 832, 834, and/or the memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 816 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various embodiments, one or more portions of the network 880 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:
    receiving, from a sender device, a request to access a webpage;
    determining that accessing the webpage requires secure access via a secure browser, the secure access being associated with a security policy;
    identifying a virtual machine that is configured to allow access to the webpage, the virtual machine directly managing a preconfigured directory that is provided by the security policy;
    causing display of the webpage in the secure browser embedded in a local browser of the sender device, the secure browser being provided by the virtual machine;
    detecting that data associated with the webpage is returned from the webpage displayed in the secure browser embedded in the local browser; and
    causing the data to be saved in a virtual memory associated with the virtual machine instead of a local memory of the sender device.

2. The method of claim 1, wherein the security policy disables one or more commands to prevent data exchanged via the secure browser from being accessed by the sender device.

3. The method of claim 2, wherein the one or more commands include one or more of: copy command, paste command, cut command, and save command.

4. The method of claim 1, wherein the security policy provides the preconfigured directory to store a first file to be uploaded to the webpage and to receive a second file returned from the webpage, the preconfigured directory being configured to prevent access by the sender device.

5. The method of claim 4, wherein uploading of the first file to the webpage and downloading of the second file may be performed automatically or manually by a user of the sender device.

6. The method of claim 1, further comprising:
    providing the sender device with a Uniform Resource Locator (URL) based on the request to access the webpage;
    detecting an activation of the URL by the sender device; and
    in response to detecting the activation of the URL, causing display of the webpage in the secure browser embedded in the local browser of the sender device based on the security policy.

7. The method of claim 1, wherein the preconfigured directory comprises a virtual data storage associated with the virtual machine in a cloud computing platform, and wherein the sender device cannot access files stored in the preconfigured directory.

8. A system comprising:
    at least one memory storing instructions; and
    one or more hardware processors communicatively coupled to the at least one memory and configured by the instructions to perform operations comprising:
        receiving, from a sender device, a request to access a webpage;
        determining that accessing the webpage requires secure access via a secure browser, the secure access being associated with a security policy;
        identifying a virtual machine that is configured to allow access to the webpage, the virtual machine directly managing a preconfigured directory that is provided by the security policy;
        causing display of the webpage in the secure browser embedded in a local browser of the sender device, the secure browser being provided by the virtual machine;
        detecting that data associated with the webpage is returned from the webpage displayed in the secure browser embedded in the local browser; and
        causing the data to be saved in a virtual memory associated with the virtual machine instead of a local memory of the sender device.

9. The system of claim 8, wherein the security policy disables one or more commands to prevent data exchanged via the secure browser from being accessed by the sender device.

10. The system of claim 9, wherein the one or more commands include one or more of: copy command, paste command, cut command, and save command.

11. The system of claim 8, wherein the security policy provides the preconfigured directory to store a first file to be uploaded to the webpage and to receive a second file returned from the webpage, the preconfigured directory being configured to prevent access by the sender device.

12. The system of claim 11, wherein uploading of the first file to the webpage and downloading of the second file may be performed automatically or manually by a user of the sender device.

13. The system of claim 8, wherein the preconfigured directory comprises a virtual data storage associated with the virtual machine in a cloud computing platform, and wherein the sender device cannot access files stored in the preconfigured directory.

14. The system of claim 8, wherein the operations further comprise:
    providing the sender device with a Uniform Resource Locator (URL) based on the request to access the webpage;
    detecting an activation of the URL by the sender device; and
    in response to detecting the activation of the URL, causing display of the webpage in the secure browser embedded in the local browser of the sender device based on the security policy.

15. A non-transitory computer-readable medium comprising instructions that, when executed by a hardware processor of a device, cause the device to perform operations comprising:
receiving, from a sender device, a request to access a webpage;
determining that accessing the webpage requires secure access via a secure browser, the secure access being associated with a security policy;
identifying a virtual machine that is configured to allow access to the webpage, the virtual machine directly managing a preconfigured directory that is provided by the security policy;
causing display of the webpage in the secure browser embedded in a local browser of the sender device, the secure browser being provided by the virtual machine;
detecting that data associated with the webpage is returned from the webpage displayed in the secure browser embedded in the local browser; and
causing the data to be saved in a virtual memory associated with the virtual machine instead of a local memory of the sender device.

16. The non-transitory computer-readable medium of claim 15, wherein the security policy disables one or more commands to prevent data exchanged via the secure browser from being accessed by the sender device.

17. The non-transitory computer-readable medium of claim 16, wherein the one or more commands include one or more of: copy command, paste command, cut command, and save command.

18. The non-transitory computer-readable medium of claim 15, wherein the security policy provides the preconfigured directory to store a first file to be uploaded to the webpage and to receive a second file returned from the webpage, the preconfigured directory being configured to prevent access by the sender device.

19. The non-transitory computer-readable medium of claim 18, wherein uploading of the first file to the webpage and downloading of the second file may be performed automatically or manually by a user of the sender device.

20. The non-transitory computer-readable medium of claim 15, wherein the preconfigured directory comprises a virtual data storage associated with the virtual machine in a cloud computing platform, and wherein the sender device cannot access files stored in the preconfigured directory.

* * * * *